(No Model.)  2 Sheets—Sheet 1.

D. W. JACOBY.
CHECK ROWER AND CORN PLANTER.

No. 298,978. Patented May 20, 1884.

Witnesses
A. Ruppert
H. J. England

D. W. Jacoby
Inventor.
Holloway & Blanchard
Attys (No Model.) 2 Sheets—Sheet 2.
D. W. JACOBY.
CHECK ROWER AND CORN PLANTER.
No. 298,978. Patented May 20, 1884.
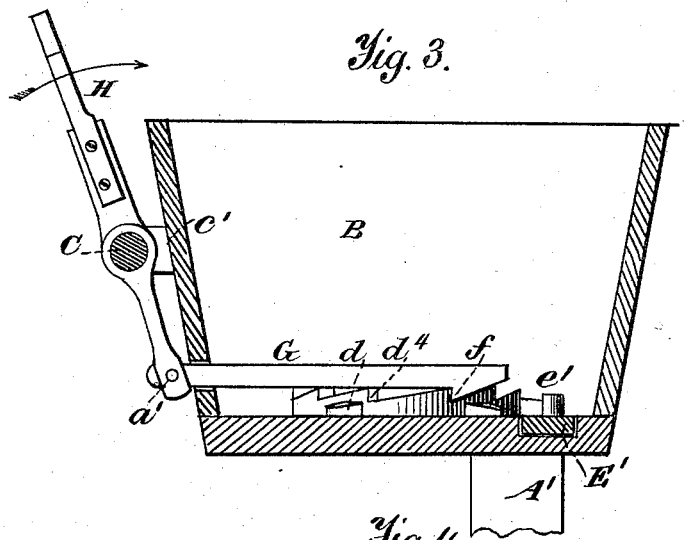
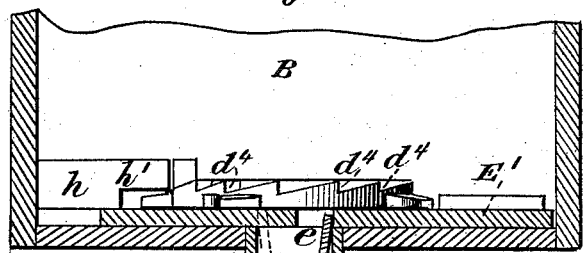
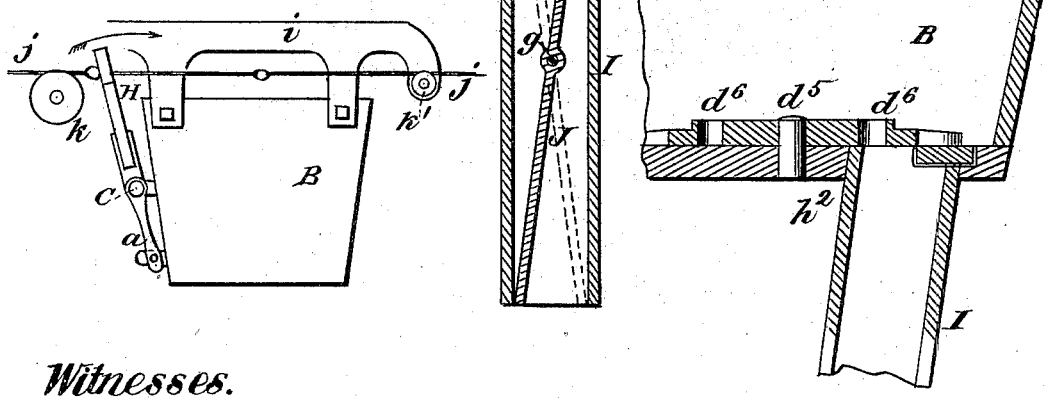
Witnesses.
A. Ruppert.
H. J. England.
D. W. Jacoby
Inventor.
Holloway & Blanchard
Atty's
N. PETERS. Photo-Lithographer, Washington, D. C.

UNITED STATES PATENT OFFICE.

DANIEL W. JACOBY, OF ABILENE, KANSAS.

CHECK-ROWER AND CORN-PLANTER.

SPECIFICATION forming part of Letters Patent No. 298,978, dated May 20, 1884.

Application filed August 18, 1883. (No model.)

*To all whom it may concern:*

Be it known that I, DANIEL W. JACOBY, a citizen of the United States, residing at Abilene, in the county of Dickinson and State of Kansas, have invented certain new and useful Improvements in a Check-Rower and Corn-Planter, of which the following is a specification, reference being had therein to the accompanying drawings.

My invention relates to corn-planters and check-rowers; and it consists in certain improvements in the construction of the same, as herein described and claimed, my device being constructed to combine a corn-planter and check-rower with mechanism to operate both simultaneously and uniformly, the object being simplicity of mechanism and reduction in the expense of manufacture and the amount of labor required.

Figure 1:
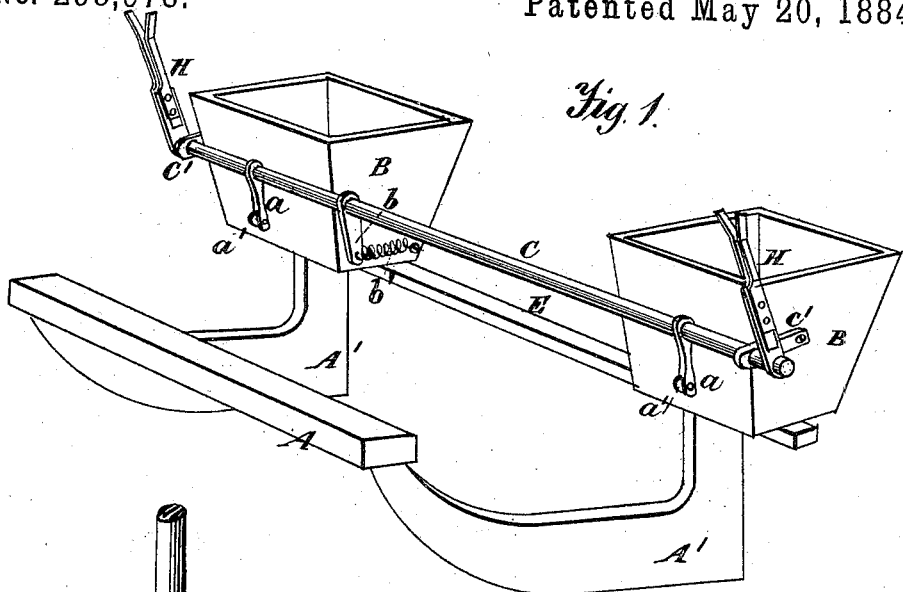
Figure 2:
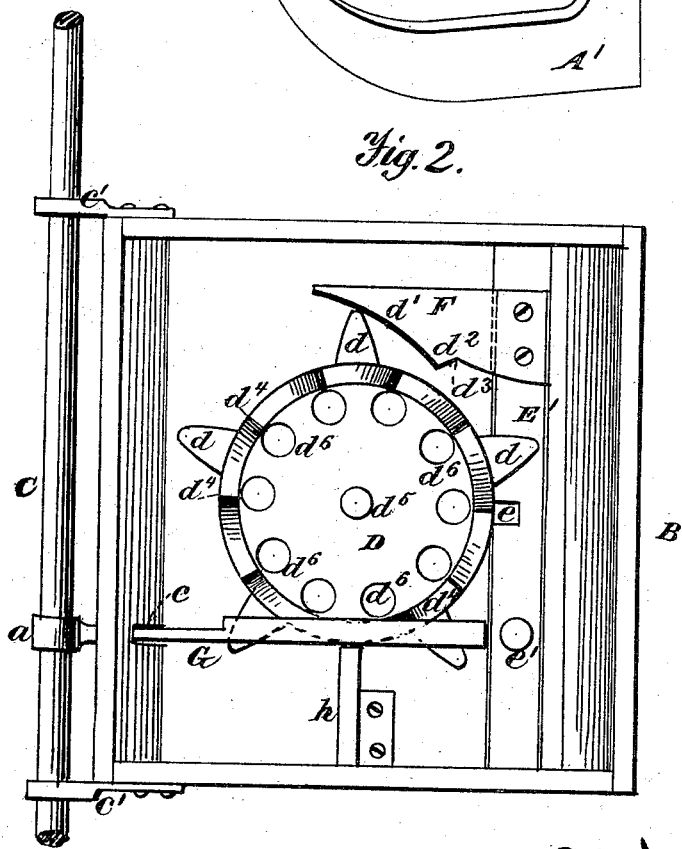

Referring to the drawings, in which similar parts are indicated by similar letters, Figure 1 is a perspective view of my invention. Fig. 2 is a plan view of one of the hoppers, showing the mechanism within the seed-box. Fig. 3 is a vertical section of hopper and connecting parts. Fig. 4 is also a vertical section illustrating hopper and connecting parts. Fig. 5 is a partial vertical section of hopper, spout, &c. Fig. 6 represents one of the hoppers with check-row attachment.

Referring to the drawings, A represents a sled having runners A' A', connected by crosspieces in the usual manner. The hoppers or seed-boxes B B are mounted on cross-bar E of the sled, and in front of said hoppers is placed a rock-shaft, C, having bearings in brackets $c'$, through which shaft the check-rowing and seed-delivering mechanisms are operated. To said shaft C, at its extremities, are fastened the upright forked arms H, intended to receive a knotted cord, by which the machine is operated as it is moved forward. The depending arms $a$ are rigidly attached to shaft C, and have their lower ends coupled to draw-rods G, which pass into the hoppers, as herein stated.

To shaft C, at a point near one of the hoppers, is rigidly secured a depending arm, $b$, the lower end of which is connected by a drawing-spring, $b'$, with the side of the hopper.

To the lower ends of arms $a$ are coupled the draw-rods G, each of said rods extending through a slot, $c$, into a hopper B, and being provided at its inner end with an angular hook or pawl, $f$, as shown in Fig. 3, to engage with projections on the upper face of a wheel, D, pivoted at $d^5$ to the bottom of the hopper.

In each hopper B is a wheel, D, provided with a series of cam-like projections, $d$, extending from its periphery, and having at the periphery a series of angular projections, $d^4$, forming notches, as shown. The said wheel has also the circular apertures $d^6$, forming successively seed-passages to the spout as the wheel is intermittently rotated. The angular pawl $f$ of each draw-rod G engages with the projections $d^4$ as the rod is intermittenly drawn outward, thus partially rotating the wheel. A guide-piece, $h$, having an angular recess, $h'$, is fastened to the bottom of each of the hoppers, as shown, said guide-piece being intended to prevent draw-rod G from moving sidewise from wheel D, and to keep the draw-rod in proper relative position with the angular projections on the wheel. A slide, E', is placed between corresponding guides in the bottom of each hopper, and has fixed thereto a vertical stud or pin, $e'$.

Fastened to the slide at one end, and projecting laterally therefrom, is a flat piece, F, the inner edge of which is formed with a curve, $d'$, and is cut away from the angle indicated by $d^2$, as seen in Fig. 2. The purpose of this formation of slide E' is as follows: Each projection $d$, as the wheel is rotated, bears against the curved edge $d'$, moving slide E' lengthwise in one direction until the projection $d$ reaches the point $d^2$, when the preceding projection $d$ impinges against the pin $e'$, causing the slide to move in the opposite direction, and thus the alternate movement of the slide in opposite directions is effected.

I indicates the spouts or seed-tubes, one leading from the bottom of each hopper, and being so constructed as to discharge the seed close to the heel of a runner A'. Each tube I, being preferably formed square in cross-section, has pivoted therein at $g$ a valve, J, formed of a flat piece with its upper end projecting into a recess, $e$, formed in the inner edge of slide E', so that said valve is opened and closed by the slide in its movements. At one vibration of valve J the seed falls from the hopper into tube I, but is held by the valve near the bottom or lower end of the tube, the next vibration of J releasing the seed, which falls to the ground at the desired point. Thus the seed is deposited in a uniform manner throughout the operation.

To one of the hoppers B is secured a bracket, $i$, supporting in proper positions two pulleys on which moves a knotted cord, $j$, passing through the fork of arm H, each knot being caught by the fork, and thus imparting the proper motion to rock-shaft C and the draw-rods G. Seed being placed in the hoppers B, the cord $j$ is adjusted within the fork of an arm, H, and the sled is moved forward. The knot on the cord strikes the fork of arm H, causing the arm to vibrate and imparting motion to the rock-shaft, turning forward the arms $a$, and thus drawing the rods G, the pawls $f$ of which, engaging with projections $d^4$ of the wheels D, cause a partial rotation of said wheels. A projection $d$ of each wheel, moving against curved surface $d'$, causes the slide E to move in one direction, taking with it the upper end of valve J. The seed falling through an aperture $d^6$ into the tube I is retained by J near the lower end of the tube until the slide is moved in opposite direction by a projection $d$ impinging against pin $e'$, thus causing a like movement of valve J, releasing the seed and depositing it in the ground at the heel of the runner, as before stated. The return movement of rock-shaft C is effected by the contraction of spring $b'$, which had been extended by the first movement of the arm $b$ on the shaft.

Having described my invention, I claim—

1. In a combined check-rower and planter, a rock-shaft, C, carrying forked arms H, and arms $a$ and $b$, the latter having a spring, $b'$, in combination with draw-rods entering the seed-boxes and provided with pawls, the seed-delivering wheels D, provided with projections $d$ and $d^4$, the slide E', having attachment F, with the curved edge, and pin $e'$, as shown, the seed-tube I, and the valve J, engaging with the slide, substantially as set forth.

2. In a planting-machine, a hopper, B, having therein a seed-delivering wheel, D, provided with cam-like projections $d$, in combination with slide E', having attachment F, with the curved edge, as shown, and pin $e'$, and a seed-tube having a valve engaging with the slide, substantially as and for the purpose set forth.

3. In a check-rower and planter, a hopper, B, with guide $h$, a wheel, D, having projections $d$ and $d^4$ and apertures $d^6$, and slide E', provided with attachment F and pin $e'$, in combination with tube I, having valve J, draw-rods G, with pawls, and suitable mechanism for operating them, substantially as set forth.

In testimony whereof I affix my signature in presence of two witnesses.

DANIEL W. JACOBY.

Witnesses:
JOHN N. SHANE,
OTIS S. SMITH.